United States Patent
Kim et al.

(10) Patent No.: US 10,957,943 B2
(45) Date of Patent: Mar. 23, 2021

(54) JIG DEVICE FOR INSPECTING QUALITY OF SECONDARY BATTERY

(71) Applicant: LG CHEM, LTD., Seoul (KR)

(72) Inventors: Seok Jin Kim, Daejeon (KR); Sang Hyun Koo, Daejeon (KR); Cha Hun Ku, Daejeon (KR)

(73) Assignee: LG CHEM, LTD., Seoul (KR)

( * ) Notice: Subject to any disclaimer, the term of this patent is extended or adjusted under 35 U.S.C. 154(b) by 231 days.

(21) Appl. No.: 16/337,313

(22) PCT Filed: Mar. 27, 2018

(86) PCT No.: PCT/KR2018/003624
§ 371 (c)(1),
(2) Date: Mar. 27, 2019

(87) PCT Pub. No.: WO2019/004567
PCT Pub. Date: Jan. 3, 2019

(65) Prior Publication Data
US 2020/0036054 A1    Jan. 30, 2020

(30) Foreign Application Priority Data
Jun. 29, 2017    (KR) .................. 10-2017-0082713

(51) Int. Cl.
*H01M 10/42*    (2006.01)
*B23K 37/04*    (2006.01)
*G01M 3/24*    (2006.01)

(52) U.S. Cl.
CPC ..... *H01M 10/4285* (2013.01); *B23K 37/0443* (2013.01); *G01M 3/24* (2013.01); *H01M 10/4228* (2013.01)

(58) Field of Classification Search
CPC ......... H01M 10/4285; H01M 10/4228; H01M 2/1016; H01M 6/5083; B23K 37/0443; G01N 29/223; G01M 3/24; G01R 31/3865
See application file for complete search history.

(56) References Cited

U.S. PATENT DOCUMENTS

| 3,508,806 A | 4/1970 | Hall |
| 2001/0019270 A1* | 9/2001 | Onishi ................ H01M 10/48 324/426 |

(Continued)

FOREIGN PATENT DOCUMENTS

| CN | 202444010 U | 9/2012 |
| CN | 104049115 B | 2/2017 |

(Continued)

OTHER PUBLICATIONS

International Search Report for PCT/KR2018/003624 (PCT/ISA/210) dated Jun. 29, 2018.

(Continued)

*Primary Examiner* — Giovanni Astacio-Oquendo
*Assistant Examiner* — Dustin R Dickinson
(74) *Attorney, Agent, or Firm* — Birch, Stewart, Kolasch & Birch, LLP (57) ABSTRACT

A jig device for inspecting quality of a secondary battery, which fixes the secondary battery and inspects quality of the secondary battery, is provided in which the jig device includes a jig base having a seating hole, a fixed module mounted on the jig base at one side of the seating hole, a first gliding module mounted on the jig base at a side opposite to the fixed module and glidable toward the fixed module, and a support part extending across the seating hole. A masking block is mounted on one or more portions of the fixed module and the first gliding module, which comes into contact with an edge of the secondary battery to fix the (Continued)

secondary battery. The first gliding module is detachable from the jig base, and the support part is separable from the fixed module and the first gliding module.

19 Claims, 8 Drawing Sheets

(56) References Cited

U.S. PATENT DOCUMENTS

| | | | |
|---|---|---|---|
| 2011/0199092 A1* | 8/2011 | Jiang | H01R 13/2421 |
| | | | 324/437 |
| 2016/0124204 A1 | 5/2016 | Suzuki et al. | |
| 2018/0123189 A1* | 5/2018 | Biswas | H01M 10/4285 |

FOREIGN PATENT DOCUMENTS

| | | |
|---|---|---|
| JP | 2011-165628 A | 8/2011 |
| JP | 2013-524457 A | 6/2013 |
| JP | 2015-153731 A | 8/2015 |
| KR | 10-1031538 B1 | 4/2011 |
| KR | 10-2015-0049462 A | 5/2015 |
| KR | 10-1534515 B1 | 7/2015 |
| KR | 10-2015-0144608 A | 12/2015 |
| KR | 10-2016-0015751 A | 2/2016 |
| KR | 10-2016-0072572 A | 6/2016 |
| KR | 10-2016-0120136 A | 10/2016 |
| KR | 10-2018-0007127 A | 1/2018 |

OTHER PUBLICATIONS

Extended European Search Report, dated Jul. 9, 2019, for European Application No. 18825160.7.

\* cited by examiner

JIG DEVICE FOR INSPECTING QUALITY OF SECONDARY BATTERY

CROSS-REFERENCE TO RELATED APPLICATION

The present application claims the benefit of the priority of Korean Patent Application No. 10-2017-0082713, filed on Jun. 29, 2017, which is hereby incorporated by reference in its entirety.

TECHNICAL FIELD

The present invention relates to a jig device for inspecting quality of a secondary battery, which is capable of fixing the secondary battery when a sealed state of a sealing part of the secondary battery is inspected while or after the secondary battery is produced.

BACKGROUND ART

Unlike primary batteries, rechargeable secondary batteries are being developed not only for digital devices but also for vehicles such as electric vehicles.

Secondary batteries are variously classified according to materials and shapes of a positive electrode and a negative electrode. Among them, since such a lithium secondary battery using a lithium compound material has large capacity and a low self-discharge rate, the lithium secondary battery is being widely used instead of a nickel-cadmium secondary battery according to the related art.

Also, the lithium secondary battery may be manufactured in various shapes. Representative examples of the shape of the lithium secondary battery include a cylinder type lithium secondary battery and a prismatic type lithium secondary battery. In recent years, a pouch type lithium secondary battery having flexibility is being manufactured.

Since the pouch type secondary battery has the flexibility, the shape of the pouch type secondary battery may be relatively freely manufactured. The pouch type secondary battery comprises a pouch and an electrode assembly built in the pouch to charge and discharge electric energy. An electrolyte is injected into the pouch in a state in which the pouch is opened. An electrode tab protruding from an end of the electrode assembly is connected to a lead that protrudes outward from the pouch.

Also, a sealing part that is sealed to seal the pouch is disposed along an edge of the pouch. That is, the sealing part may be an edge portion that is thinner than a portion, in which the electrode assembly is built, within the pouch.

Here, a pouch sealant is applied to an adhesion surface of the sealing part, and a tab sealant is applied to an adhesion surface of the electrode tab. Also, as described above, when the applied pouch and tab sealants are heated and melted by a sealing tool, the sealing of the sealing part of the pouch may be performed.

However, if the sealing of the sealing part is not properly performed, the internal electrolyte may leak to cause defective products. To solve the problem related to the leakage of the electrolyte in the related art, various means have been required.

DISCLOSURE OF THE INVENTION

Technical Problem

In order to prevent the problem related to the leakage of the electrolyte due to the defective sealing part, a quality inspection of the sealing part may be additionally performed by using ultrasonic waves. The present applicant had filed an application on Jul. 12, 2016, entitled "an apparatus and method for inspecting sealability of a pouch type secondary battery" (Patent Application No. 10-2016-0087925).

The apparatus for inspecting the sealability as described above comprises an irradiating device irradiating ultrasonic waves, a receiving device receiving the ultrasonic waves, a measuring device measuring transmittance of the ultrasonic waves. The ultrasonic waves are irradiated onto the sealing part to measure the sealability of the sealing part.

Also, in order to realize accurate measurement while the ultrasonic waves are irradiated, the pouch type secondary battery has to be fixed to a fixed body to prevent the sealing from moving and being shaken while the ultrasonic measurement is performed.

Figure 1:
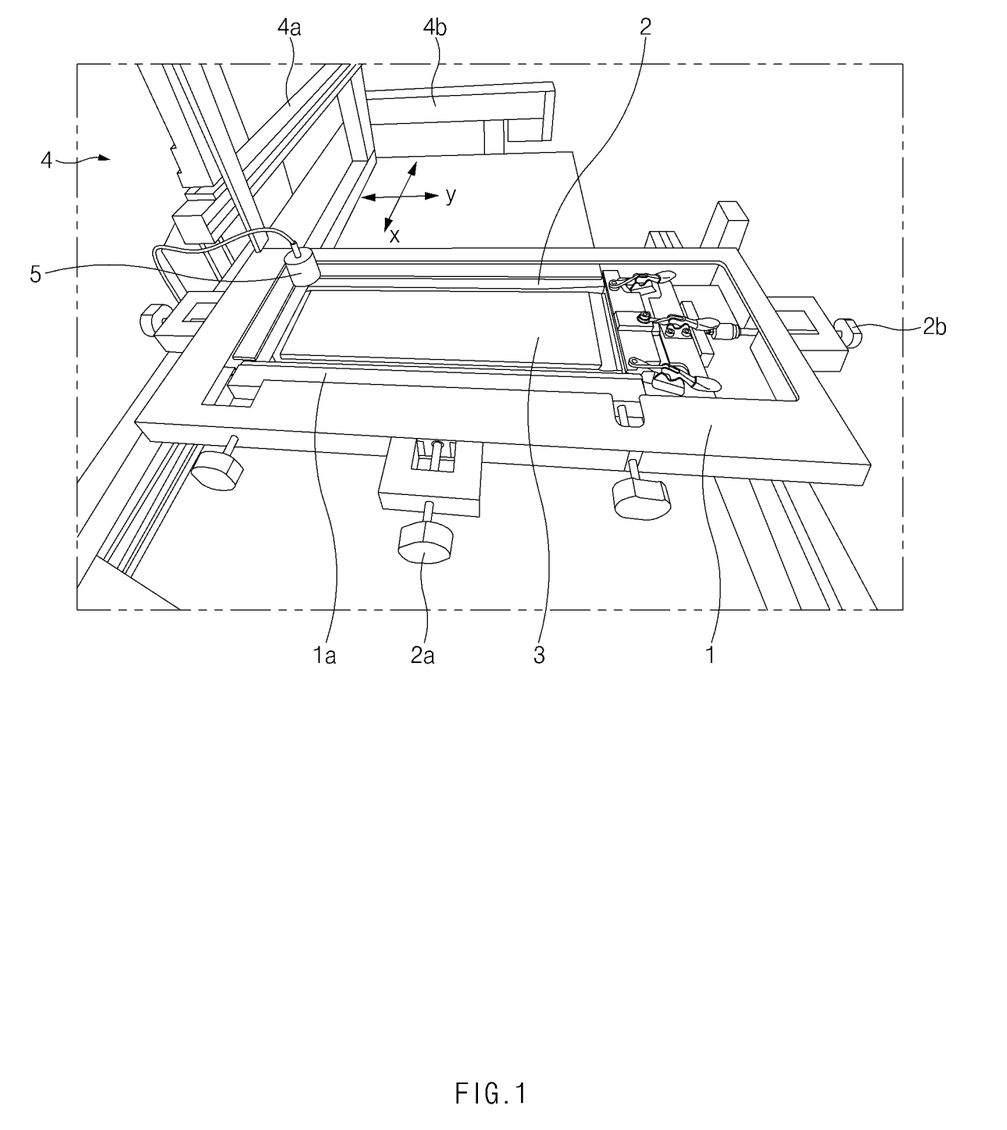
FIG. 1 is a perspective view illustrating a state in which a jig device is coupled to an ultrasonic irradiating device.

Thus, the present applicant has developed a jig device for inspecting quality of the secondary battery as the fixed body for fixing the secondary battery as illustrated in FIG. 1. The jig device 1 is disposed on a lower portion of a gliding device 4 on which an ultrasonic irradiating device 5 is mounted to fix the secondary battery 3. The gliding device 4 is constituted by gliding mechanisms 4a and 4b, which are glided in x and y directions and coupled to each other, to fix the secondary battery 3 while the irradiating device 5 moves in the x and y directions. The jig device 1 is glided so that gliding-side sides 1a and 1b come into contact with the sealing part of the secondary battery 3 when the secondary battery 3 is seated on a fixed-side side 2 within the jig device 1. The gliding of the gliding-side sides 1a and 1b is controlled by hand drive bolts 2a and 2b. However, the jig device 1 has to be individually manufactured in various sizes and standards according to a size and standard of the secondary battery.

Thus, in order to solve the above-described problem, an object of the present invention is to provide a jig device for inspecting quality of a secondary battery, which is capable of fixing the secondary battery having various sizes (while various types of quality inspections are performed to confirm sealability of a sealing part).

Technical Solution

To achieve the above-described objects, the present invention provides a jig device for inspecting quality of a secondary battery, which fixes the secondary battery and inspects quality of the secondary battery, the jig device comprising: a jig base having a plate shape and a seating hole; a fixed module mounted on the jig base at one side of the seating hole; a first gliding module mounted on the jig base at a side opposite to the fixed module and glidable toward the fixed module; and a support part extending across the seating hole, the support part having a first end connected to the fixed module and a second end connected to the first gliding module and on which the secondary battery is placed, wherein a masking block is mounted on one or more portions of the fixed module and the first gliding module, which comes into contact with an edge of the secondary battery when placed on the support part, and when the masking block contacts the edge of the secondary battery, the secondary battery is fixed, wherein the first gliding module is detachable from the jig base, and wherein the support part is separable from the fixed module and the first gliding module.

The fixed module may be detachable from the jig base.

A wall part may protrude upward along a circumference of the jig base, and a second gliding module that is glidable in a direction perpendicular to the first gliding module may be mounted on any one position of the wall part.

Another masking block may be detachably mounted on a portion of the second gliding module, which comes into contact with the edge of the secondary battery.

An additional masking block may be detachably mounted on the wall part opposite to the another masking block such that, when the secondary battery is moved by the second gliding module, the additional masking block comes into contact with the secondary battery.

Furthermore, each of the first gliding module and the second gliding module may be adjusted according to a rotation direction of a hand drive bolt, the hand drive bolt being screw-coupled to pass through the wall part. Each hand drive bolt may be provided in plurality so that at least two or more hand drive bolts are spaced apart from each other and may be mounted on each of the first gliding module and the second gliding module.

The masking block may be made of a material having elasticity, preferably, a silicon material.

The support part may have a width that is less than a width of each of the secondary battery and the seating hole, and the support part may have a shape of which portions connected to the fixed module and the first gliding module have a width that is less than that of a central portion of the support part.

A measuring device may be mounted to the fixed module for measuring a size of a lead partially protruding from the secondary battery when the secondary battery is seated adjacent to the fixed module. Also, another measuring device mounted to the first gliding module for measuring the size of another lead partially protruding from the secondary battery when the secondary battery is seated adjacent to the first gliding module.

Also, a clamp may be mounted on each of the fixed module and the first gliding module, and the clamp of each of the fixed module and the first gliding module may be connectable to the support part.

Advantageous Effects

According to the present invention comprising the above-described constituents, the first gliding module and the support part may be individually separated from each other, and thus, the secondary batteries having different sizes may be placed on the jig base, and the first gliding module and the support part may be replaced to match the size of the replaced secondary battery. That is, the secondary batteries having the various sizes may be fixed without replacing the entire jig device in addition to the jig base and the fixed module.

Also, the fixed module may also be selectively replaced, and the second gliding module that is glided in a direction crossing the first gliding module may be additionally provided to support the secondary batteries in various directions.

Also, since the masking block made of the material having elasticity supports the sealing part of the secondary battery, the sealing module may be prevented from being deformed when the first gliding module and/or the second gliding module are glided.

Since each of the first gliding module and the second gliding module is glided by two or more hand drive bolts, the user may easily horizontally align the first gliding module and the second gliding module. Also, since the support part prevents the secondary battery from drooping and has the shape that is partially reduced in width, the area through which the ultrasonic waves pass through the seating hole via the sealing part may increase.

Furthermore, according to the present invention, the measuring device for measuring the size of the lead may be added to measure the size of the lead in addition to the quality inspection using the ultrasonic waves. Also, the support part may be mounted on the fixed module and the first gliding module through the clamp and thus be easily separated.

MODE FOR CARRYING OUT THE INVENTION

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly illustrate the present invention, parts that are not related to the description are omitted, and the same or similar components are denoted by the same reference numerals throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to a jig device for inspecting quality of a secondary battery, and more particularly, to a jig device for inspecting quality of a secondary battery, which fixes the secondary battery to perform smooth quality inspection when quality of a sealing part of the secondary battery is inspected by using various inspection devices comprising an ultrasonic inspection device.

In the jig device according to the present invention, components for fixing the secondary battery placed on a jig base may be mounted on the jig base. At least one or more components may be detachably mounted, and a masking block having elasticity may be detachably mounted on a portion coming into contact with the sealing part.

Figure 2:
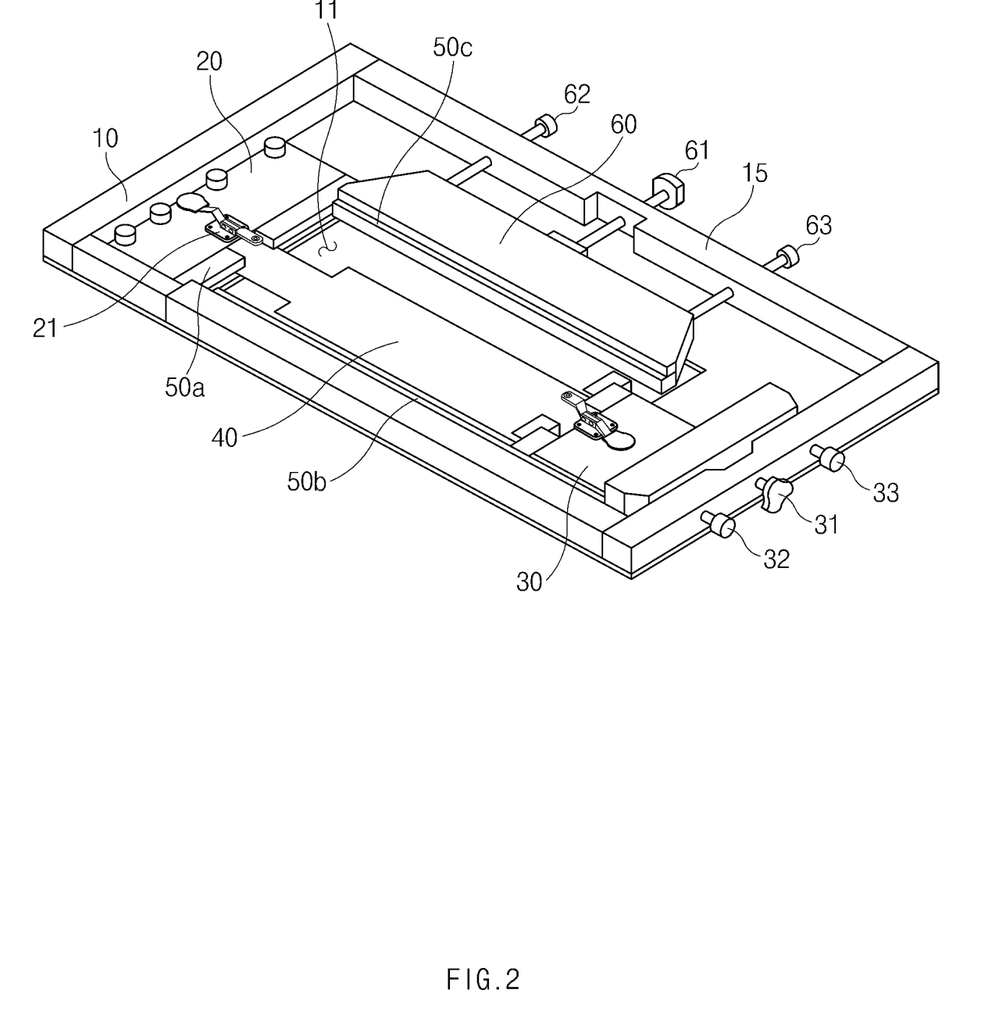
FIG. 2 is a schematic perspective view of the jig device according to the present invention.

That is, referring to the jig device of FIG. 2, to which technical ideas of the present invention are applied, the jig base 10 has a rectangular plate shape, and a seating hole 11 is punched in a position (that preferably has a rectangular shape like a shape of a general pouch type secondary battery, but it not limited thereto, i.e., may have various shapes) on which a secondary battery (not shown) is seated. Also, when the secondary battery is placed on the portion of the seating hole 11, a fixed module 20 and a first gliding module 30 are respectively disposed to face each other on both sides of the seating hole so that the fixed module 20 and the first gliding module 30 are supported to come into contact with both ends of the secondary battery.

Here, the fixed module 20 may be mounted to be maintained in position. On the other hand, the first gliding module 30 may be glided to approach or be away from the fixed module 20 by adjusting hand drive bolts 31, 32, and 33 (in a longitudinal direction of the secondary battery).

Also, a support part 40 is mounted to cross the seating hole 11. The support part is configured to support the secondary battery. The support part 40 has one end connected to the fixed module 20 and the other end connected to the first gliding module 30. Also, the support part 40 has a size at which the entire seating hole 11 is not covered, i.e., a size at which both the sealing parts are exposed to the seating hole 11 when the secondary battery is placed on the support part 40.

Furthermore, a masking block 50a is mounted on a portion of at least one (the fixed module in FIG. 2) of the fixed module 20 and the first gliding module 30, which comes into contact with an edge of the secondary battery. The masking block 50a is made of a material (e.g., a silicon material, a rubber material, a synthetic material, and the like) having elasticity to prevent the sealing part from being pressed to be deformed when the first gliding module 30 is glided to come into contact with the sealing part after the secondary battery is seated. Also, the masking block 50a may be additionally mounted on a second gliding module 60 and a wall part opposite to the second gliding module 60. Thus, when the masking blocks 50a, 50b, and 50c are closely attached to the edge (i.e., the sealing part) of the secondary battery, the secondary battery may be fixed.

In a preferred embodiment of the present invention, the first gliding module 30 and/or the fixed module 20 may be detachably disposed on the jig base 10, and the support part 40 may be separably disposed on the fixed module 20 and the first gliding module 30.

Thus, since the first gliding module 30 and the support part 40 are individually separable, secondary batteries having relatively large or small sizes may be alternately disposed on the jig base 10, and the first gliding module 30 and the support part 40 may be replaced with the first gliding module 30 and the support part 40, which match a size of a replaced secondary battery. That is, the secondary batteries having the various sizes may be fixed without replacing the jig base 10.

Also, in a preferred embodiment of the present invention, the wall part 15 protrudes upward along a circumference of the jig base 10, and a second gliding module 60 that is glidable in a direction perpendicular to the first gliding module 30, is mounted on any one place of the wall part 15. As described above, the masking block 50c may be detachably mounted on a portion of the second gliding module 60, which comes into contact with the edge of the secondary battery. When the second gliding module 60 moves the secondary battery, the masking block 50b may be detachably mounted on the wall part coming into contact with the secondary battery.

Furthermore, the gliding of each of the first gliding module 30 and the second gliding module 60 may be adjusted according to rotation directions of the hand drive bolts 31, 32, 33, 61, 62, and 63, which are screw-coupled to pass through the wall part. At least two or more hand drive bolts spaced apart from each other may be mounted on each of the first gliding module 30 and the second gliding module 60. The hand drive bolts 31 and 61 of the above-described hand drive bolts entirely move each of the first gliding module 30 and the second gliding module 60, and the hand drive bolts 32, 33, 62, and 63, which are disposed on both sides, are used to horizontally adjust each of the first gliding module 30 and the second gliding module 60.

Also, the present invention may provide two embodiments according to a position of a lead of the secondary battery, i.e., whether the lead has a one-way structure (a first embodiment) in which the lead is disposed on only one side of the secondary battery or has a two-way structure (a second embodiment) in which the lead is disposed on each of both sides of the secondary battery.

First Embodiment

Figure 3:
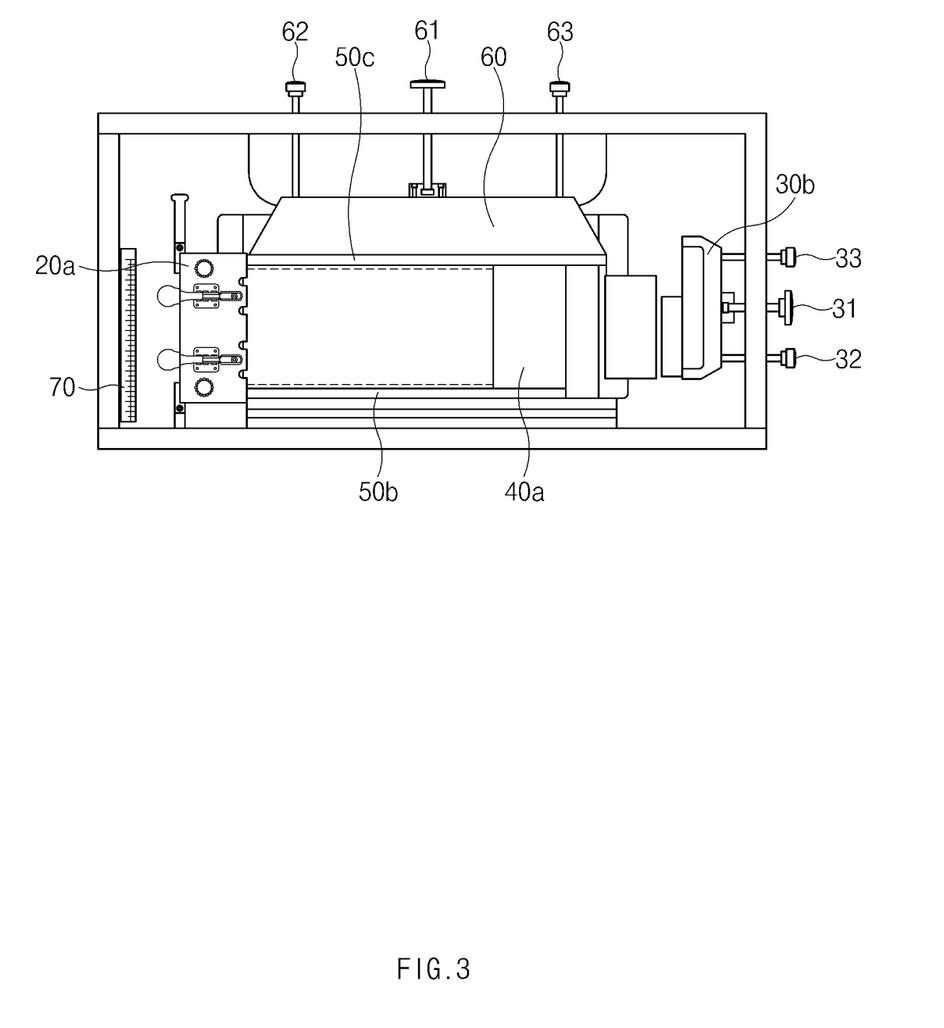
FIG. 3 is a plan view of a jig device according to a first embodiment of the present invention.
Figure 4A:
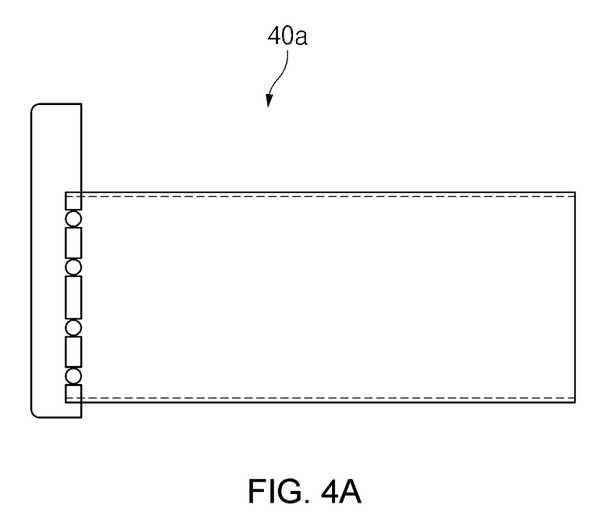
FIGS. 4A and 4B are a plan view and a front view, respectively, illustrating one side of a support part according to the first embodiment of the present invention.
Figure 4B:
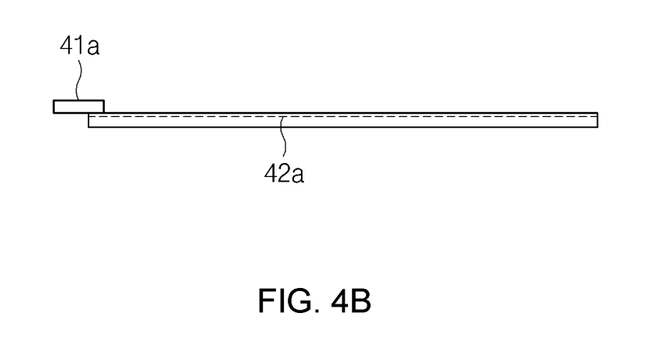
Figure 5:
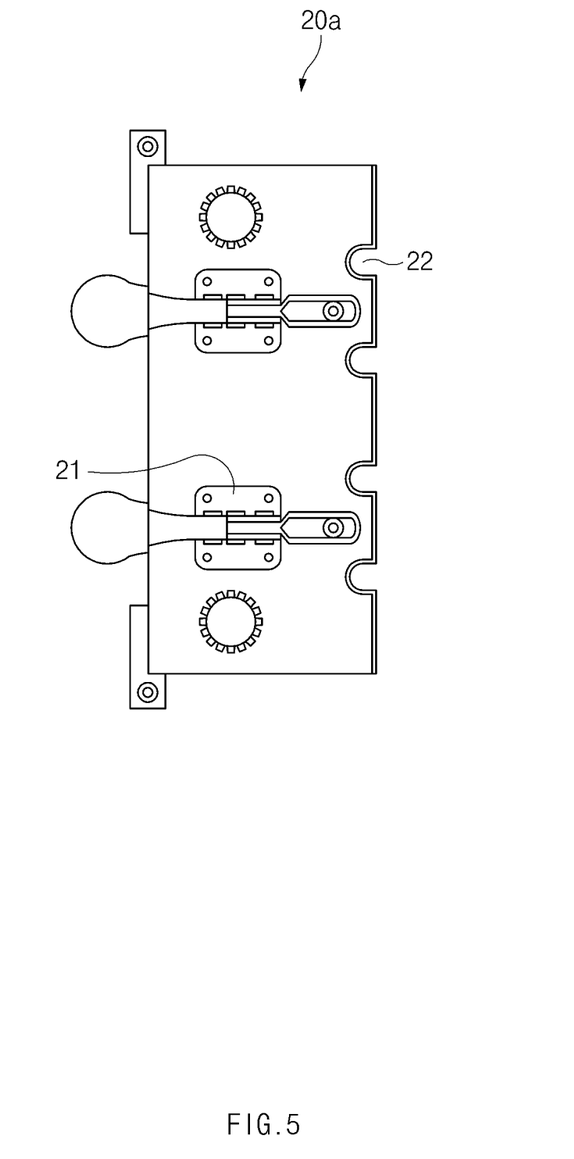
FIG. 5 is a plan view of a fixed module according to the first embodiment of the present invention.

FIG. 3 is a plan view of a jig device according to a first embodiment of the present invention, FIG. 4 is a plan and front view illustrating one side of a support part according to the first embodiment of the present invention, and FIG. 5 is a plan view of a fixed module according to the first embodiment of the present invention.

Referring to the drawings, a jig device according to the first embodiment has a structure for inspecting a secondary battery having a one-way structure in which the lead is disposed on only one side. Here, a side from which the lead protrudes is disposed to come into contact with a fixed module 20a.

When the secondary battery is placed on a support part 40a, a first gliding module 30b and a second gliding module 60 are glided to fix the secondary battery in the same manner as the above-described manner. As illustrated in FIG. 4, the support part 40a according to the first embodiment comprises a mount 41a mounted on an edge portion of a seating hole 11 and a support 42a coupled to the mount 41a with a stepped portion (a height difference) therebetween to support the secondary battery. Each of the mount 41a and the support 42a may have various shapes and sizes according to a shape of the secondary battery or required conditions of the inspection apparatus.

Furthermore, in the first embodiment, a measuring device 70 for measuring a size of a lead partially protruding from the secondary battery when the secondary battery is seated adjacent to the fixed module 20a may be mounted (see FIG. 3). Also, as illustrated in FIG. 5, holes 22 for measuring a stepped portion (for example, a deviation in width and length due to mass-production) of the secondary battery may be additionally formed. For example, the holes may be disposed at predetermined intervals. Thus, a method for measuring a degree of the deviation or a method for measuring the deviation by displaying scales on the holes may be applied according to the number of holes 22.

Also, a clamp (see reference numeral 21 of FIG. 2) for fixing or separating the support part 40a may be additionally mounted on the fixed module 20a to easily realize the connection of the support part 40a.

Second Embodiment

Figure 6:
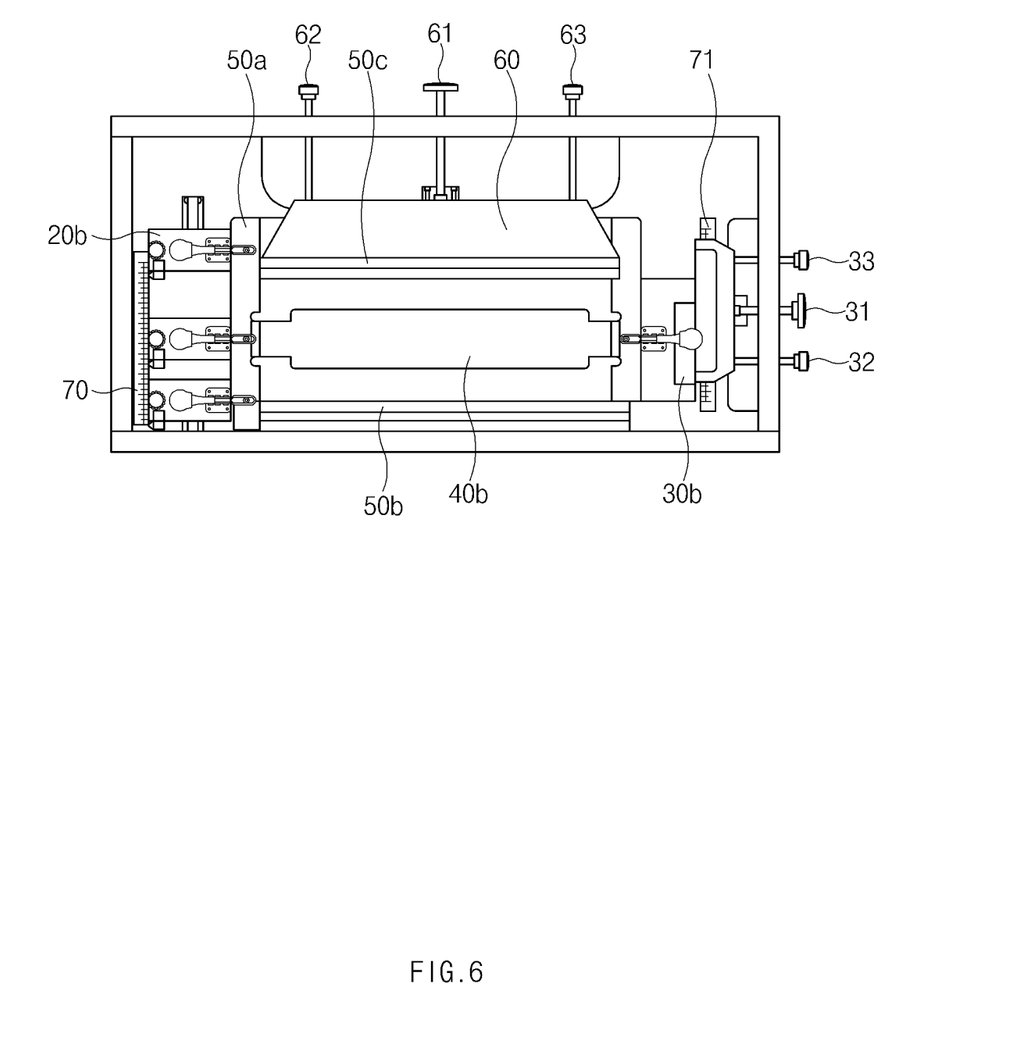
FIG. 6 is a plan view of a jig device according to a second embodiment of the present invention.
Figure 7A:
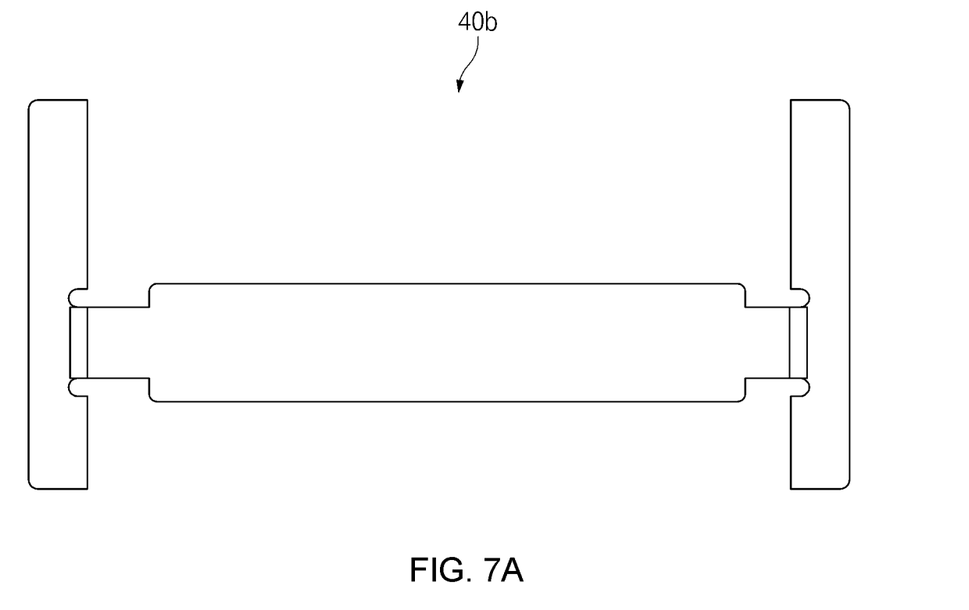
FIGS. 7A and 7B are a plan and a front view, respectively, of a support part according to the second embodiment of the present invention.
Figure 7B:
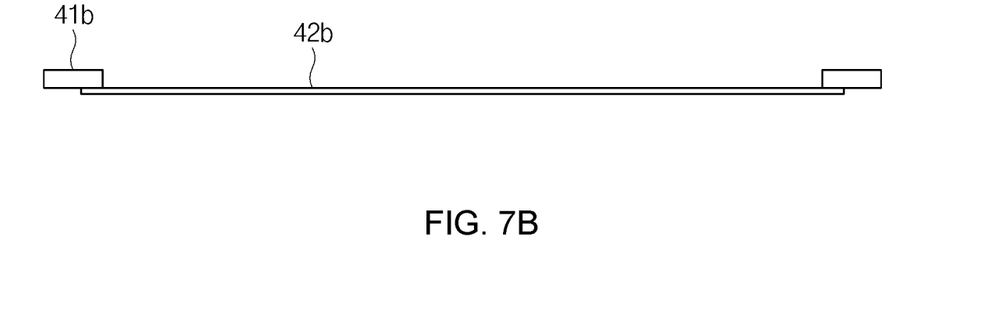
Figure 8:
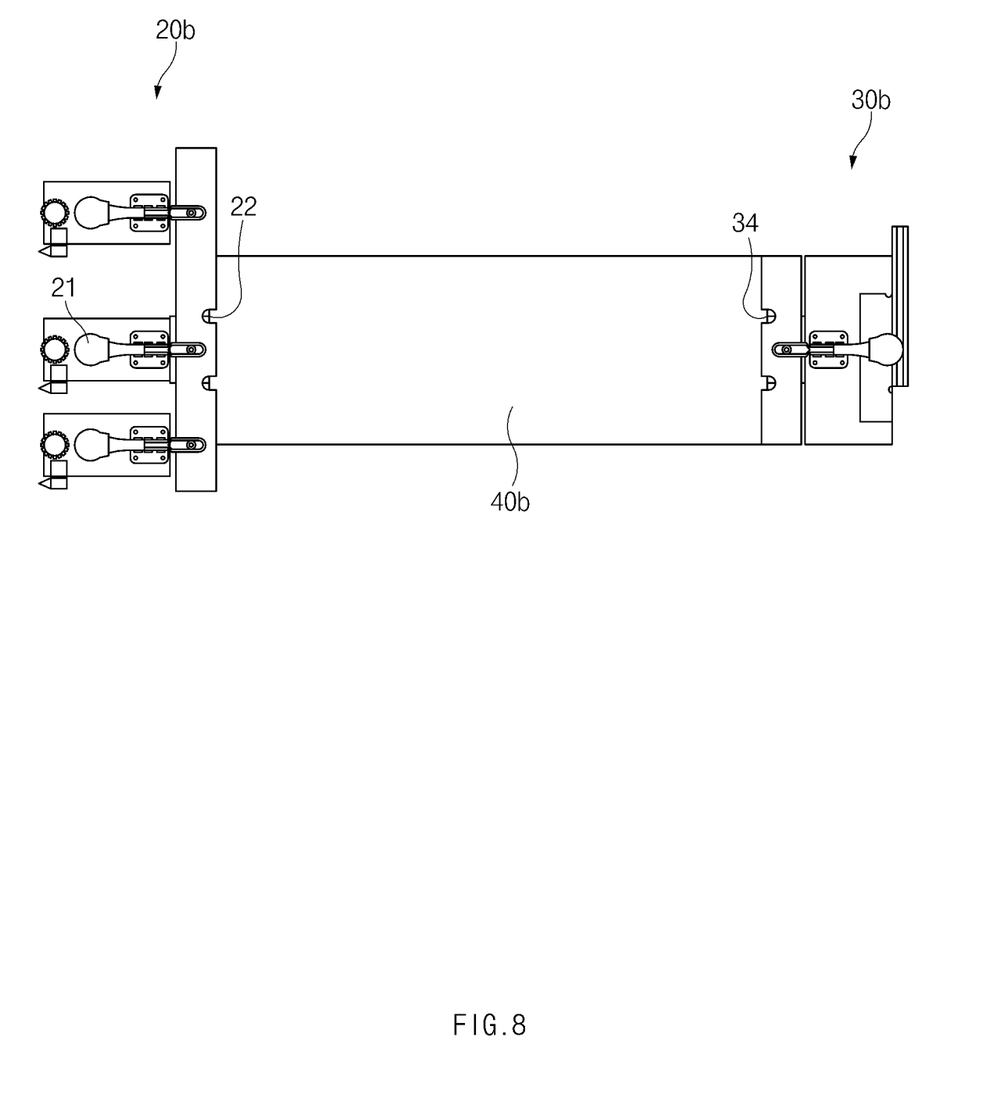
FIG. 8 is a plan view of a fixed module and a gliding module according to the second embodiment of the present invention.

FIG. 6 is a plan view of a jig device according to a second embodiment of the present invention, FIG. 7 is a plan and front view of a support part according to the second embodiment of the present invention, and FIG. 8 is a plan view of a fixed module and a gliding module according to the second embodiment of the present invention.

Referring to the drawings, a jig device according to the second embodiment has a structure for inspecting a secondary battery having a two-way structure in which the lead is disposed on each of both sides. Here, a side from which one lead protrudes is disposed to come into contact with a fixed module 20b.

When the secondary battery is placed on a support part 40b, a first gliding module 30b and a second gliding module 60 are glided to fix the secondary battery in the same manner as the above-described manner. As illustrated in FIG. 7, the support part 40b according to the second embodiment comprises a mount 41b mounted on an edge portion of a seating hole 11 and a support 42b coupled to the mount 41b with a stepped portion therebetween to support the secondary battery. Each of the mount 41b and the support 42b may have various shapes and sizes according to a shape of the secondary battery or required conditions of the inspection apparatus.

In FIG. 7, the support part 40b has shape with a width that is narrower than that of each of the secondary battery and the seating hole. The support part 40b may have a shape of which a portion connected to the fixed module 20b and the first gliding module 30b has a width narrower than that of a central portion thereof.

Furthermore, in the second embodiment, measuring devices 70 and 71 for measuring a size of a lead partially protruding from the secondary battery when the secondary battery is seated adjacent to the fixed module 20b may be respectively mounted on both sides (see FIG. 6). Also, as illustrated in FIG. 8, holes 22 and 34 for measuring a stepped portion of the secondary battery may be formed in both sides. The holes 22 and 34 for measuring the stepped portion may be formed in the fixed module 20b and the first gliding module 30b and also formed in the mount 41b of the support part 40b.

Also, in this embodiment, clamps 21 for fixing or separating the support part 40b may be disposed on both sides, respectively.

The measuring devices 70 and 71 may be selectively mounted on any one place or all both sides as necessary to measure the size of lead the partially protruding from the secondary battery.

According to the prevent invention comprising the above-described constituents, since the first gliding module and the support part 40 are individually separable, secondary batteries having various sizes may be disposed on a jig base 10, and the first gliding module 30 and the support part 40 may be replaced with the first gliding module 30 and the support part 40, which match a size of a replaced secondary battery. That is, for example, only a portion of the first gliding module 30 and the support part 40 may be replaced in a state in which the jig base 10 and the fixed module 20 are left in place to fix the secondary batteries having the various sizes.

Particularly, masking blocks 50a, 50b, and 50c, each of which is made of an elastic material, may be detachably mounted on a portion coming into contact with a sealing part of the secondary battery. Thus, when the secondary battery moves by the gliding of the first gliding module 30 and the second gliding module 60, a pressure by which the sealing part of the secondary battery is deformed may be prevented from being applied to the sealing part.

That is, when the first gliding module 30 and the second gliding module 60 push the sealing part of the secondary battery, the masking blocks 50a, 50b, and 50c may absorb an impact like sponge to transmit force. Also, each of the masking blocks 50a, 50b, and 50c may be elastically deformed to a shape that is depressed from the portion coming into contact with the sealing part by the pressure. Thus, the masking blocks 50a, 50b, and 50c may come into contact with each other in a vertical direction of the sealing part at the portion of the sealing part, which is depressed by the pressure to more effectively suppress the shaking and movement of the sealing part.

Also, according to the present invention, the fixed module may also be replaced, and the second gliding module 60 that is glided in a direction crossing the first gliding module 30 may be additionally provided to support the secondary battery in various directions.

Also, since each of the first gliding module 30 and the second gliding module 60 is glided by two or more hand drive bolts 31, 32, 33, 61, 62, and 63, the user may easily horizontally align the first gliding module 30 and the second gliding module 60. Also, since the support part 40 prevents the secondary battery from drooping and has the shape that is partially reduced in width, an area through which ultrasonic waves pass through the seating hole via the sealing part may increase.

Furthermore, according to the present invention, measuring devices 70 and 71 for measuring dimensions of the secondary battery may be added to measure the size of the lead in addition to the quality inspection using the ultrasonic waves. Also, the support part 40 may be mounted on the fixed module and the first gliding module through the clamp 31 and thus be easily separated.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A jig device for inspecting quality of a secondary battery, which fixes the secondary battery and inspects quality of the secondary battery, the jig device comprising:
   a jig base having a plate shape and a seating hole;
   a fixed module mounted on the jig base at one side of the seating hole;
   a first gliding module mounted on the jig base at a side opposite to the fixed module and glidable toward the fixed module; and
   a support part extending across the seating hole, the support part having a first end connected to the fixed module and a second end connected to the first gliding module and on which the secondary battery is placed,
   wherein a masking block is mounted on one or more portions of the fixed module and the first gliding module, which comes into contact with an edge of the secondary battery when placed on the support part, and when the masking block contacts the edge of the secondary battery, the secondary battery is fixed,
   wherein the first gliding module is detachable from the jig base, and wherein the support part is separable from the fixed module and the first gliding module.

2. The jig device of claim 1, wherein the fixed module is detachable from the jig base.

3. The jig device of claim 2, wherein a wall part protrudes upward along a circumference of the jig base, and
wherein a second gliding module that is glidable in a direction perpendicular to the first gliding module is mounted on any one position of the wall part.

4. The jig device of claim 2, wherein the masking block is made of a material having elasticity.

5. The jig device of claim 2, wherein the support part has a width that is less than a width of each of the secondary battery and the seating hole.

6. The jig device of claim 2, further comprising a measuring device mounted to the fixed module for measuring a size of a lead partially protruding from the secondary battery when the secondary battery is seated adjacent to the fixed module.

7. The jig device of claim 2, wherein a clamp is mounted on each of the fixed module and the first gliding module, and the clamp of each of the fixed module and the first gliding module is connectable to the support part.

8. The jig device of claim 1, wherein a wall part protrudes upward along a circumference of the jig base, and
wherein a second gliding module that is glidable in a direction perpendicular to the first gliding module is mounted on any one position of the wall part.

9. The jig device of claim 8, wherein another masking block is detachably mounted on a portion of the second gliding module, which comes into contact with the edge of the secondary battery.

10. The jig device of claim 9, wherein an additional masking block is detachably mounted on a wall part opposite the another masking block such that, when the secondary battery is moved by the second gliding module, the additional masking block comes into contact with the secondary battery.

11. The jig device of claim 8, wherein each of the first gliding module and the second gliding module is adjusted according to a rotation direction of a hand drive bolt, the hand drive bolt being screw-coupled to pass through the wall part.

12. The jig device of claim 11, wherein each hand drive bolt is provided in a plurality so that at least two or more hand drive bolts are spaced apart from each other and are mounted on each of the first gliding module and the second gliding module.

13. The jig device of claim 1, wherein the masking block is made of a material having elasticity.

14. The jig device of claim 13, wherein the masking block is made of a silicon material.

15. The jig device of claim 1, wherein the support part has a width that is less than a width of each of the secondary battery and the seating hole.

16. The jig device of claim 15, wherein the support part has a shape of which portions connected to the fixed module and the first gliding module have a width that is less than that of a central portion of the support part.

17. The jig device of claim 1, further comprising a measuring device mounted to the fixed module for measuring a size of a lead partially protruding from the secondary battery when the secondary battery is seated adjacent to the fixed module.

18. The jig device of claim 17, further comprising another measuring device mounted to the first gliding module for measuring the size of the another lead partially protruding from the secondary battery when the secondary battery is seated adjacent to the first gliding module.

19. The jig device of claim 1, wherein a clamp is mounted on each of the fixed module and the first gliding module, and the clamp of each of the fixed module and the first gliding module is connectable to the support part.

* * * * *